US008865038B2

(12) United States Patent
Orlych et al.

(10) Patent No.: US 8,865,038 B2
(45) Date of Patent: *Oct. 21, 2014

(54) DOUBLE-SIDED SLIP-RESISTANT MATERIAL AND METHOD OF MAKING SAME

(71) Applicant: Multi Technologies Industrial L.L.C., Brentwood, NH (US)

(72) Inventors: George M. Orlych, Barrington, NH (US); Mike C. Sullivan, Cape Elizabeth, ME (US)

(73) Assignee: Multi Technologies Industrial L.L.C., Brentwood, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,754

(22) Filed: Jul. 9, 2013

(65) Prior Publication Data

US 2014/0042671 A1    Feb. 13, 2014

Related U.S. Application Data

(63) Continuation of application No. 12/689,050, filed on Jan. 18, 2010, now Pat. No. 8,480,836.

(60) Provisional application No. 61/150,405, filed on Feb. 6, 2009.

(51) Int. Cl.
*B29C 47/06* (2006.01)
(Continued)

(52) U.S. Cl.
CPC .............. *B29C 53/10* (2013.01); *B29C 49/6472* (2013.01); *B29C 47/8805* (2013.01); *B29C 49/6409* (2013.01); *B29C 47/0042* (2013.01); *B29C 47/8845* (2010.10); *B29C 44/24* (2013.01); *B29C 44/50* (2013.01); *B29C 47/0026* (2013.01); *B29C 47/0057* (2013.01); *B29C 47/0059* (2013.01); *B29C 47/009* (2013.01); *B29C 47/06* (2013.01); *B29C 55/023* (2013.01); *B29C 55/06* (2013.01); *B29C 2791/007* (2013.01); *B29K 2023/00* (2013.01); *B29K 2023/083* (2013.01); *B29K 2105/045* (2013.01); *B32B 25/08* (2013.01); *B32B 27/08* (2013.01); *B32B 27/32* (2013.01); *B32B 37/08* (2013.01); *B32B 37/153* (2013.01); *B32B 37/28* (2013.01); *B32B 2038/0048* (2013.01); *B32B 2038/006* (2013.01); *B32B 2307/744* (2013.01); *B32B 2323/00* (2013.01); *B29D 7/01* (2013.01); *B29C 47/0021* (2013.01); *B29C 47/04* (2013.01); *B29C 47/065* (2013.01)
USPC .................. 264/46.1; 264/173.12; 264/209.3; 264/288.4; 264/514; 264/563; 156/244.27

(58) Field of Classification Search
CPC ............ B29C 47/0042; B29C 47/8805; B29C 47/8845; B29C 49/6409; B29C 49/6472; B29C 53/10
USPC ......... 264/510, 512, 514, 555, 563, 564, 565, 264/46.1, 173.12, 209.3, 288.4; 156/244.14, 244.27
See application file for complete search history.

(56) References Cited

U.S. PATENT DOCUMENTS 2,995,318 A * 8/1961 Cook et al. .................... 244/3.16
3,649,731 A * 3/1972 Cronin ......................... 264/46.7

(Continued)

*Primary Examiner* — Atul P. Khare
(74) *Attorney, Agent, or Firm* — Bourque and Associates, PA

(57) ABSTRACT

A double-sided, slip resistant material is produced using a blown film process which produces a film having an interior heat sealable layer, a core layer of flexible polyolefin and an exterior polyolefin elastomer layer in combination with a blowing agent and optionally grit to produce a double-sided slip resistant material. A number of rollers may be provided after nip rollers have fused the film together, and which form part of a machine direction orienter (MDO) that may be used in line in the manufacturing process to heat, and then cool and condition (anneal and relieve any stresses and/or thickness inconsistencies in the film) prior to the film being wound onto a roll for storage.

9 Claims, 1 Drawing Sheet

(51) Int. Cl.
*B29C 47/88* (2006.01)
*B29C 49/64* (2006.01)
*B29C 53/10* (2006.01)
*B29C 47/00* (2006.01)
*B29C 44/24* (2006.01)
*B29C 44/50* (2006.01)
*B29C 55/02* (2006.01)
*B29C 55/06* (2006.01)
*B32B 25/08* (2006.01)
*B32B 27/08* (2006.01)
*B32B 27/32* (2006.01)
*B32B 37/28* (2006.01)
*B29D 7/01* (2006.01)
*B29D 7/00* (2006.01)
*B29K 23/00* (2006.01)
*B29K 105/04* (2006.01)
*B32B 37/08* (2006.01)
*B32B 37/15* (2006.01)
*B32B 38/00* (2006.01)
*B29C 47/04* (2006.01)

(56) References Cited

U.S. PATENT DOCUMENTS

| | | | | |
|---|---|---|---|---|
| 3,659,000 A | * | 4/1972 | Cronk | 156/229 |
| 4,045,270 A | * | 8/1977 | Jofs | 156/229 |
| 4,277,594 A | * | 7/1981 | Matthews et al. | 526/352 |
| 4,390,573 A | * | 6/1983 | Bullard et al. | 383/116 |
| 4,985,188 A | * | 1/1991 | Ishio et al. | 264/471 |
| 5,350,471 A | * | 9/1994 | Planeta | 156/156 |
| 5,468,444 A | * | 11/1995 | Yazaki et al. | 264/566 |
| 5,478,645 A | * | 12/1995 | Chang | 428/347 |
| 6,413,346 B1 | * | 7/2002 | Planeta et al. | 156/229 |
| 6,699,549 B1 | * | 3/2004 | Ueyama et al. | 428/36.7 |
| 7,063,764 B1 | * | 6/2006 | Lori et al. | 156/244.27 |
| 8,480,836 B2 | * | 7/2013 | Orlych et al. | 156/244.14 |
| 8,632,706 B2 | * | 1/2014 | Orlych et al. | 264/46.1 |
| 2003/0144369 A1 | * | 7/2003 | Marrelli | 521/50 |
| 2005/0136219 A1 | * | 6/2005 | Guenter et al. | 428/141 |

* cited by examiner

US 8,865,038 B2

DOUBLE-SIDED SLIP-RESISTANT MATERIAL AND METHOD OF MAKING SAME

CROSS-REFERENCE TO RELATED APPLICATIONS

This application is a Continuation of U.S. patent application Ser. No. 12/689,050, which was filed on Jan. 18, 2010 entitled "Double-Sided Slip-Resistant Material And Method of Making Same" which in turn claims priority to U.S. Provisional Patent Application No. 61/150,405 filed on Feb. 6, 2009 entitled "Double-Sided Slip-Resistant Material and Method of Making Same" both applications which are incorporated fully herein by reference.

TECHNICAL FIELD

The present invention relates to slip resistant material and more particularly, relates to a slip resistant, lightweight cloth-like material useful for products such as, but not limited to, a drop cloth for the moving and painting industry.

BACKGROUND INFORMATION

There is often a need for lightweight protective material such as drop cloths to cover floors and furniture during moving, construction or other activities such as painting and decorating. One problem that has consistently been struggled with for such material is the need of the material to be relatively impervious to liquids such as water and paint.

The prior art has dealt with the problem of waterproofing lightweight cloth materials by placing a plastic coating on one or both sides of a paper or cloth material. Unfortunately, although this makes the product waterproof, it also makes it very slippery. If a painter cannot place a ladder on the material without fear that it will slip out from under him or her, they are not apt to use it.

There have been some prior art attempts at making non-slip surfaces but this relates mostly to roofing materials or more permanent material such as floor tapes and the like.

Accordingly, what is needed is a lightweight, reusable, puncture resistant, cloth like material that is generally impervious to water and other liquids while providing at least one surface that is a non-slip surface.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

The present invention features a two-sided slip resistant material made by the blown film process, which process is well known in the industry, comprising the co-extrusion of multiple layers to produce a finished film composite having the desired characteristics described herein.

Figure 1:
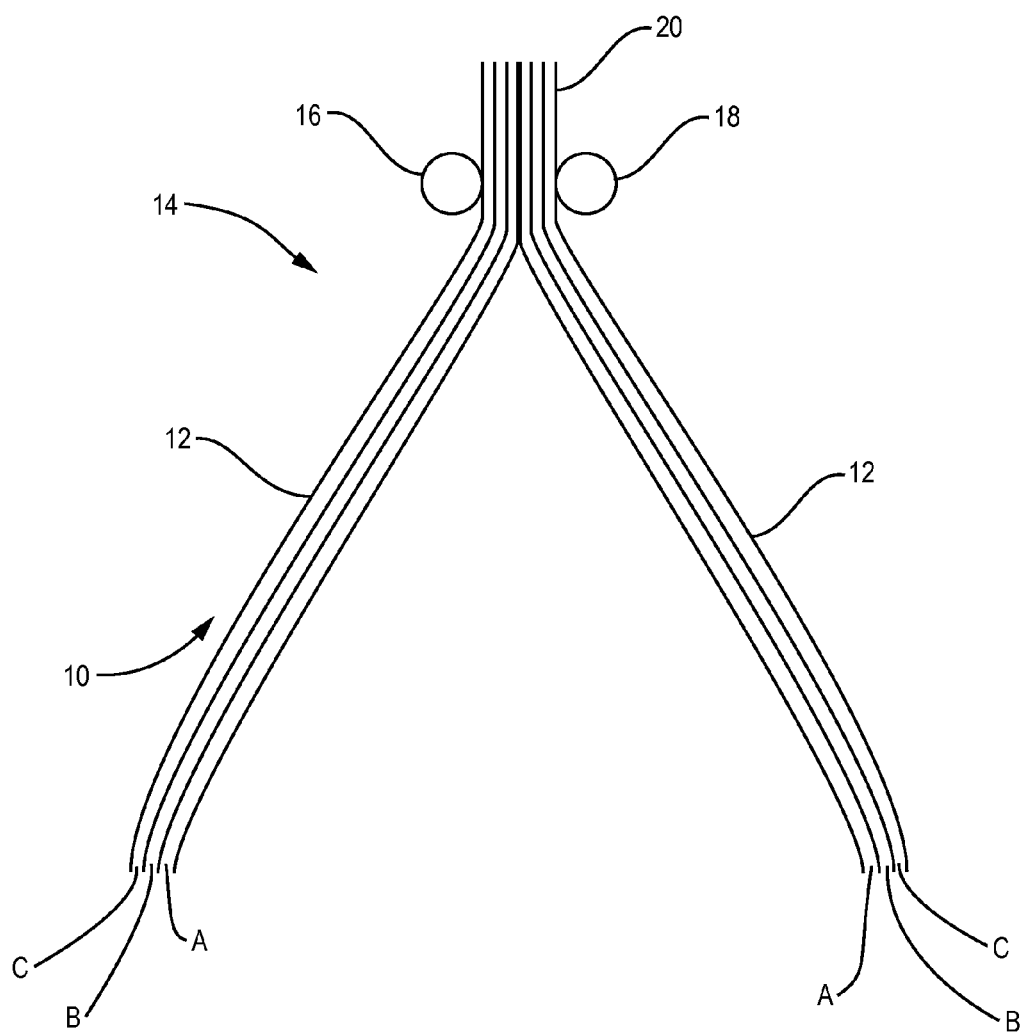
FIG. 1 is a perspective schematic view of a portion of a system for making the slip resistant material according to the present invention.

As illustrated in FIG. 1, a film blowing machine (not shown but well known in the art) produces a film "bubble" 10 comprising, in the preferred embodiment and without limiting the present invention, 3 layers or films: A, B and C. In the preferred embodiment, layer A, (the inside most layer of the bubble) is a heat sealable thermoplastic layer of approximately 0.2-2 mils in thickness having a softening point in the range of 110° to 200° F. which facilitates gluing of the two "A" layers together at a low temperature, as will be described below. Layer A may be an EVA, EMA, LDPE or POP resin based layer. An advantage of using an Ethyl Vinyl Acetate (EVA) layer is that the VA (vinyl acetate) content may be adjusted to achieve the desired softening point of the layer to facilitate its gluing or fusing to an adjacent similar layer.

Layer B, the central or center layer, is preferably a flexible polyolefin layer having a thickness of approximately 0.5-2 mils. Suitable material for the center "B" layer include, LDPE, LLDPE, TPO, and POE. In addition to the resin this layer may also include a colorant, UV stabilizer, UV absorber and antioxidant, which will be exposed during the manufacturing process after the formation of the collapsed bubbles in the C layer. An example of a potential UV Stabilizer is Chimassorb 994™; examples of potential antioxidants include Irganox 1010™, Irganox 1076™ and Irgafos 168™; and an example of a potential UV Stabilizer is Cyasorb UV-531™.

The C layer (the outermost layer of the film which forms the top and bottom of the finished film product) is also a flexible polyolefin layer. This layer, however, contains a "blowing" agent that causes the film to form many small "bubbles" on the exterior surface 12 of the C layer. The blowing agent creates a gas in the extruder during the melting process and this gas is distributed throughout the "C" layer and is soluble in the molten plastic due to the high extruder pressure. When the film exits the blown film die, there is a drop in pressure, and bubbles form in the "C" layer. By, stretching and cooling the film, the bubbles collapse forming a rough, nonslip open celled surface 12.

The blowing agent can be either a physical blowing agent (PBA) such as carbon dioxide or butane, or an exothermic or endothermic chemical blowing agent (CBA) such as a sodium bicarbonate and citric acid mixture, which decomposes under heat during the extrusion process and produces a gas.

In the preferred embodiment, the preferred flexible polyolefin is a polyolefin elastomer (POE) such as Dow Chemical's "Engage" product preferably, Engage grade 8003. After considerable experimentation, it has been determined that not all polyolefin elastomers are suitable for the skid resistance application. A resin with appropriate melting point, and softness to create bubbles that are very rubbery, flexible and have a high Coefficient of Friction (COF) creating a surface with significant "slip" resistance is required. These characteristics, which can be found in the Engage 8003 product include: flexural modulus less than 200 MPa, and Durometer hardness (Shore A) less than 100.

In addition to the polyolefin elastomer, layer C may also include a coloring agent, to color the finished product, a UV stabilizer, UV absorber and antioxidant, as well as a grit material such as ultra-high molecular weight polyolefin which will adhere to the outside of the bubbles formed by the blowing agent and add additional slip resistance to the finished film.

Near the top of the bubble 14, two rollers 16, 18 (top nip rollers) are utilized to "collapse" the bubble 14 causing both sides of the bubble to come together. In the preferred embodiment, one of the rollers is a rubber roller while the other is a metal nip roller, which may heated or may not be heated if there is enough residual heat in the film to cause the two inner layers (layers "A") to fuse of bond together. The temperature of the nip roller is such that if needed, it is above the softening point of the resin in the "A" layer. This causes the two inside "A" layers to fuse together forming a single film structure.

Figure 2:
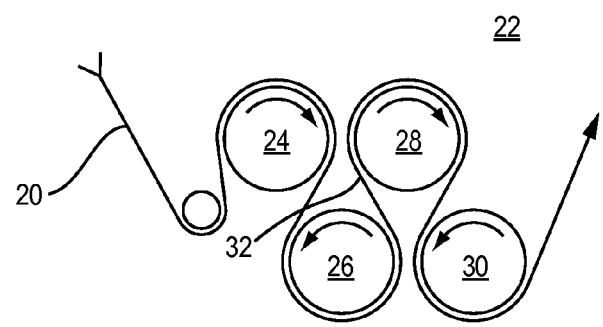
FIG. 2 is a schematic diagram of the travel path of the double-sided slip resistant material of the present invention after the material has been blown showing incorporation of a machine direction orienter (MDO) in-line in the manufacturing process according to one embodiment of the present invention.

The processing of the fused film layer 20 is shown schematically in FIG. 2. In one embodiment, after the film 20 leaves the nip rollers 16/18, the film enters a set of in-line rollers 24-30, which serve as a Machine Direction Orienter (MDO) 22. The MDO rollers 22 serve as a post treatment of the film, annealing or conditioning the film to take any stresses out of the film and to remove any variation in film thickness. The MDO section consists of 2 sets of 2 rollers each. The first two rollers 24/26 are heated to above the glass transition temperature of the resin of the inside A layer of the film 20. These rollers operate at a speed, which is the same as the speed at which the blown film 20 is manufactured.

The next two rollers 28/30 are cooling rollers operated at a temperature in the range of 80-100° F. In addition, the cooling rollers 28/30 are operated at a speed of 2% to 10% faster than the line or manufacturing speed at which the first 2 rollers 24/26 operate, thus causing the now fused, double-sided film to stretch in the region and direction indicated generally by arrow 32. The MDO section anneals the film, gives it a second heat treatment annealing the film and relieving it of any stresses.

The pair of cooling rollers 28/30 serve to cool the film down before it is wound into a roll for later use. Although the use of an MDO is known in the art, it is not known to place such a device "in line" in the manufacturing process. Typically, in the prior art, a film is blown, wound onto a roll, subsequently unwound into an MDO for stretching, and then rewound before use. Accordingly, the present invention provides a double-sided non-slip, waterproof, plastic film which is easy and relatively inexpensive to manufacture and which is very slip resistant on both sides, and can be used for numerous applications such as painter's drop cloths, non-slip protective coverings, moving cloths and the like.

The set of in-line rollers 24-30, which serve as a Machine Direction Orienter (MDO) 22 are optional and provided in one embodiment while in another embodiment, they may be omitted.

Modifications and substitutions by one of ordinary skill in the art are considered to be within the scope of the present invention, which is not to be limited except by the allowed claims and their legal equivalents.

The invention claimed is:

1. A method for making a double-sided film having an interior heat sealable layer, a core layer of flexible polyolefin, and an exterior slip-resistant layer based on a polyolefin elastomer, the method comprising steps of:
    using a film-blowing machine to coextrude from a circular die a multilayer film tube of at least three coextruded layers, wherein the coextruded film tube includes an inner layer of heat sealable resin having a predetermined softening point, a middle layer corresponding to said core layer, and an outer layer corresponding to said exterior layer, wherein said outer layer comprises a blowing agent causing gas bubbles to form in the outer layer during said coextrusion, and wherein said tube has a first and second side each including said three layers;
    drawing the coextruded multilayer film tube away from the circular die at a predetermined speed;
    at a predetermined distance from the circular die, collapsing the coextruded multilayer film tube by passing the film tube through at least two collapsing nip rollers placed in close proximity to one another so that a first roller of said at least two nip rollers contacts said first side of the coextruded multilayer film tube and a second roller of said at least two nip rollers contacts said second side of the coextruded multilayer film tube, wherein said second roller is a rubber roller, and wherein said first roller is a metal nip roller heated to a temperature at or above the predetermined softening point of said heat sealable inner layer so as to cause fusing of the inner layer of the first film tube side with the inner layer of the second film tube side, thereby forming the coextruded multilayer film tube into a fused, double-sided film; and
    further treating the fused double-sided film so as to collapse said plurality of gas bubbles and form a rough, slip-resistant, open-celled exterior surface from said outer layer on the fused double-sided film.

2. The method of claim 1, wherein said further treating comprises:
    passing the fused double-sided film through a pair of heated in-line rollers, wherein at least one of said pair of heated in-line rollers is heated above the glass transition temperature of said heat sealable inner layer, said pair of heated in-line rollers rotating at approximately the same speed as said predetermined speed at which the coextruded multilayer film tube is drawn from the circular die; and
    subsequent to passing the fused double-sided film through said pair of heated in-line rollers, passing the fused double-sided film through a pair of cooled in-line rollers rotating faster than said pair of heated in-line rollers so as to stretch the fused double-sided film in at least one direction, wherein at least one of said pair of cooled in-line rollers is operated at a temperature cooler than the predetermined softening point of said heat sealable inner layer, and wherein said plurality of gas bubbles are collapsed by said stretching and cooling.

3. The method of claim 1, wherein said inner layer comprises a material selected from the group consisting of an EVA, EMA, LDPE, or POP resin.

4. The method of claim 1, wherein said inner layer comprises EVA resin having a vinyl acetate content which is adjusted to achieve a desired predetermined softening point.

5. The method of claim 1, wherein said blowing agent is a physical blowing agent or an exothermic or endothermic chemical blowing agent.

6. The method of claim 1, wherein said blowing agent is a physical blowing agent selected from the group consisting of carbon dioxide and butane.

7. The method of claim 1, wherein said blowing agent is an exothermic or endothermic chemical blowing agent comprising a combination of sodium bicarbonate and citric acid.

8. The method of claim 1, wherein said outer layer comprises at least one of the following: a coloring agent, a UV stabilizer, a UV absorber, and an antioxidant.

9. The method of claim 1, wherein said outer layer further comprises a grit material which inheres to the outside of said gas bubbles formed by the blowing agent, thereby providing additional slip resistance to the exterior surface of the double-sided film.

* * * * *